United States Patent [19]

Hurley et al.

[11] Patent Number: 4,725,364
[45] Date of Patent: Feb. 16, 1988

[54] LAMINAR FLOW FILTRATION PROCESS

[75] Inventors: Rupert B. Hurley, Williamsburg; Frederick B. Eastwood, Gloucester, both of Va.

[73] Assignee: BASF Corporation, Williamsburg, Va.

[21] Appl. No.: 551,643

[22] Filed: Nov. 14, 1983

Related U.S. Application Data

[63] Continuation-in-part of Ser. No. 365,768, Apr. 5, 1982, abandoned.

[51] Int. Cl.$^4$ .............................................. B01D 29/30
[52] U.S. Cl. .................................. 210/767; 210/497.3
[58] Field of Search .............. 210/767, 787, 445, 446, 210/497.3

[56] References Cited

U.S. PATENT DOCUMENTS

| | | | |
|---|---|---|---|
| 2,763,636 | 9/1956 | Davis | 526/221 |
| 2,865,511 | 12/1958 | Hopkins, Jr. | 210/497.3 X |
| 3,718,259 | 2/1973 | Harrison | 210/787 X |
| 3,747,771 | 7/1973 | Ruthrof | 210/409 |
| 3,992,886 | 11/1976 | Scott | 210/445 X |
| 4,119,775 | 10/1978 | Bambury et al. | 424/246 X |

OTHER PUBLICATIONS

Purchas, Derek B., "Industrial Filtration of Liquids", 2nd Edition, CRC Press, Cleveland, Ohio, 1971, pp. 8, 9, 48–53.

Primary Examiner—David Sadowski
Attorney, Agent, or Firm—Rupert B. Hurley, Jr.; Tom R. Vestal

[57] ABSTRACT

Described herein is a process for the removal of particulates from a fluid undergoing laminar flow. The invention is especially useful in that it enables the removal of soft, gelatinous particulates from a viscous liquid.

9 Claims, 7 Drawing Figures

TABLE I

| | LAMINAR FLOW FILTER: concentration of particulates greater than 100µ in size | RONIGEN - PETTER FILTER: concentration of particulates greater than 100µ in size |
|---|---|---|
| Results of Dilution-Filtration Analysis at 44 (before filtration) | 15 gels /cc | 15 gels /cc |
| Results of Dilution-Filtration Analysis at 46 (after filtration) | 0 gels /cc | 11 gels /cc |

LAMINAR FLOW FILTRATION PROCESS

This case is a continuation in part of Ser. No. 06/365,768, filed Apr. 5, 1982, now abandoned.

BACKGROUND OF THE INVENTION

1. Field of the Invention

The present invention pertains to the art of filtration and specifically applies to the filtration of a system which is undergoing laminar flow within a conduit. The system is a multiphase system having particulates therein. The particulates have a higher resistance to deformation than the liquid which they are in. The invention is suited to all systems which are undergoing laminar flow both before and during the filtration step. The invention is especially useful in the filtration of high viscosity fluids as high viscosity fluids undergo laminar flow at higher shear stress than low viscosity fluids. Although the present invention is useful for the filtration of "hard" particulates, the present invention is especially suited to the filtration of "soft" partly deformed particulates from a liquid. The invention is conceived to be useful in many areas including textiles, plastics, paints and many other areas in which particulates are removed from a system undergoing laminar flow in a conduit, especially polymers in a liquid state.

2. Prior Art Statement

Prior art in the field of filtration includes the use of structurally similar devices in the filtration of systems undergoing turbulent flow in a conduit (see U.S. Pat. Nos. 3,747,771; 4,119,775; 3,992,886; and 3,718,259). U.S. Pat. No. 3,718,259 pertains to the separation of viscous fluids, and operates upon a completely different principle than the principle of operation of the present invention.

One of the major purposes of the presnt invention is the removal of soft particulates which are very easily deformed (gels, for example). The prior art has been relatively ineffective in removing very soft, easily deformed particulates from relatively viscous fluids. Presently, thick filter cloths installed in high pressure filter presses (in the textile industry for example in processes similar to the process described in U.S. Pat. No. 2,763,636) are used to remove soft, deformable particulates from viscous polymer solutions. The filter presses attempt to separate soft, deformable particulates from the fluid just as hard, relatively nondeformable particulates are removed by the standard filtration techniques commonly used in turbulent flow systems. These thick filter cloths have a limited lifetime because the soft particulates eventually penetrate the felts because the soft particulates are easily deformed under the conditions of filtration so that they eventually squeeze through the thick filter cloths (for a description of the operation of these filter presses in this particular application, see Example I).

In addition to the utilization of filter presses in the removal of soft particulates from viscous solutions, Ronigen-Petter filters have also been used. A Ronigen-Petter filter consists of an outer hollow cylinder (of 10" diameter, for example) and an inner hollow cylinder, the inner cylinder having perforated walls (of 5" diameter, for example). A sock-shaped filter cloth is placed over the perforated portion of the inner cylinder and a viscous liquid having particulates therein (gels in a 2000 poise polymer solution, for example) is pumped into a confined region between the outer and inner cylinders, so that the liquid is then forced against the sock shaped filter cloth with the particulates remaining on the filter cloth. The viscous liquid then permeates the filter cloth, leaving the soft particulates on the surface of the filter cloth. The purified liquid then exits one end of the inner cylinder. A Ronigen-Petter filter has been utilized in place of and in addition to filter presses described above in the filtration of viscous polymer solution produced in accordance with U.S. Pat. No. 2,763,636.

Both the filter press and the Ronigen-Petter filters utilize a method of filtration identical in principle to that used in the filtration of turbulent flow systems (i.e. liquid undergoing turbulent flow both prior to and during the filtration process) and they both accumulate soft particulates upon the filtering medium. Not only do the soft and small particulates eventually penetrate the filter, particulates can also clog the filter if their concentration is high enough. In the use of both types of filters for the purpose of filtering polymer solutions (e.g. polymer solutions as described in U.S. Pat. No. 2,763,636) prior art filters have operated effectively for periods as short as 5 minutes to periods as long as one month, depending upon the particulate concentration.

BRIEF SUMMARY

The present invention is considered to be a pioneering invention due not only to the fact that the process of the present invention continuously removes soft particulates from viscous liquids, but also because the present invention is capable of a degree of removal of extremely soft and easily deformed particulates which no prior art process is capable of. The present invention is concerned with removing particulates from a fluid which is undergoing laminar flow through a conduit. The removal of particulates is performed by a filter, the filter having the ability to concentrate particulates within the fluid and to continuously separate a stream of concentrated particulates from the fluid, so that a first stream of concentrated particulates and a second stream of particulate-free fluid emerge from the filter. The physical and chemical characteristics of the filter are governed by the physical and chemical characteristics of both the liquid and the particulates. The major advantage of the present invention is found in its ability to separate soft, easily deformed particulates from viscous fluids undergoing laminar flow in a conduit. In addition, the process of the present invention is capable of simultaneously separating both "hard" and "soft" particulates from a liquid undergoing laminar flow in a conduit.

It is an object of the invention to continuously remove soft, easily deformable particulates from a liquid while the liquid is undergoing laminar flow in a conduit.

It is a further object of the invention to continuously remove soft, easily deformed particulates from a viscous liquid while the viscous liquid is undergoing laminar flow in a conduit.

It is a further object of the invention to continuously remove hard relatively non-deformable particulates from a fluid while the fluid is undergoing laminar flow in a conduit.

It is a further object of the invention to continuously and simultaneously remove both hard and soft particulates from a fluid while the fluid is undergoing laminar flow in a conduit.

It is a further object of the invention to remove particulates from a fluid in an efficient manner in relation to energy requirements, capital investment, and equipment maintenance.

It is a further object of the invention to achieve a high degree of removal of soft, easily deformed particulates from a viscous liquid.

DETAILED DESCRIPTION OF THE INVENTION

Figure 1:
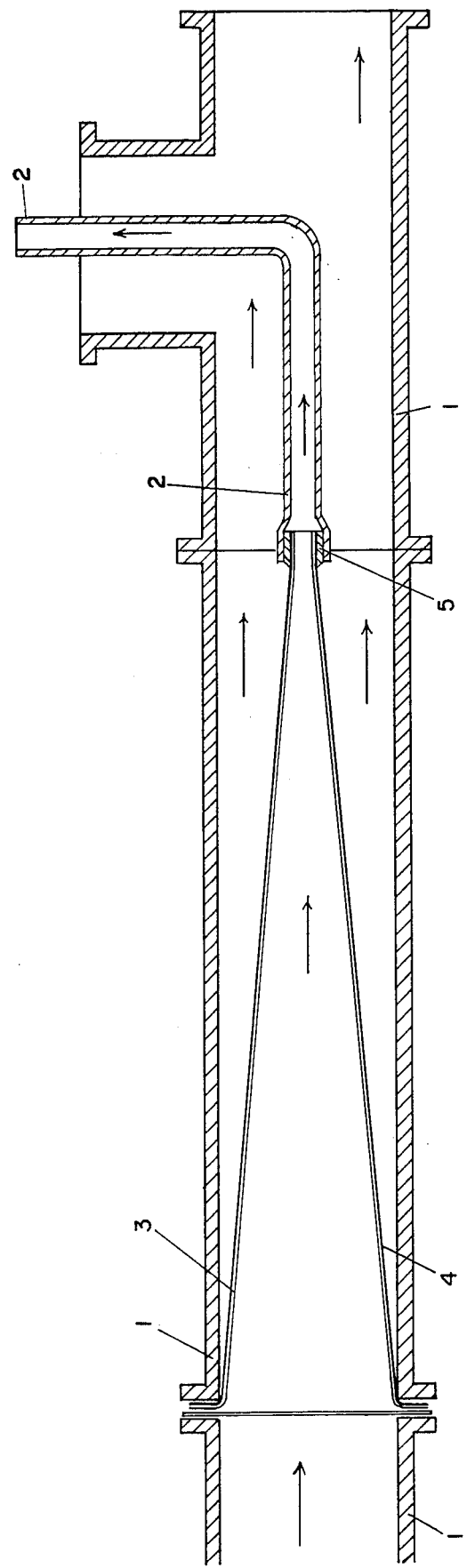
FIG. 1 is a longitudinal cross sectional view of a laminar flow funnel filter in a conduit.

In order to fully understand the present invention, a discussion of the flow of liquids through conduits (e.g. pipes) is in order. In general, the less viscous a fluid, the larger the conduit, and the greater the flow rate, the more the flow conditions tend to impart turbulent flow characteristics to the liquid undergoing flow. Conversely, the more viscous the fluid, the smaller the conduit, and the slower the flow rate, the more the flow conditions tend to impart laminar flow characteristics to the liquid undergoing flow. Particulates within a liquid undergoing laminar flow travel in straight lines. Particulates within a liquid undergoing turbulent flow travel in tortuous, virtually random paths caused by eddies, etc. within the liquid undergoing turbulent flow. Generally, liquid flow is characterized as either laminar or turbulent (see Technical Paper No. 410, *Flow of Fluids Through Valves, Fittings, and Pipes*, copyright 1965, Crane Company, 4100 S. Kedzie Avenue, Chicago, Ill. 60632). The flow characteristics can be predicted by calculating the Reynolds Number. The Reynolds Number is dependent upon the pipe diameter, the velocity of flow, the density of the liquid undergoing flow, and the viscosity of the liquid undergoing flow. A Reynolds Number of less than 2000 is generally considered to predict laminar flow while a Reynolds Number of greater than 4000 is generally considered to predict turbulent flow. Between a Reynolds Number of 2000 and 4000 the flow characteristics are unpredictable, i.e. the flow characteristics may be either laminar or turbulent.

In the prior art, substantially identical methods have been employed in the filtration of systems undergoing laminar flow and systems undergoing turbulent flow. The present invention utilizes the straight line movement found in laminar flow in the art of filtration. This is an application heretofore unrelated to the art of filtration as the prior art in the field of filtration has virtually ignored the different flow characteristics found in laminar flow as opposed to turbulent flow. For most applications, the difference in the characteristics (turbulent vs. laminar) is not critical, as relatively hard, nondeformable particulates (most particulates of concern in the prior art have been relatively hard and nondeformable) may be removed from a system undergoing either laminar or turbulent flow simply by forcing the system through a filter having a pore size smaller than the smallest "hard" particulate one desires to remove from the system. Because the hard particulate cannot deform under the conditions of filtration, the hard particulate never penetrates the filter medium and hence is trapped or "filtered out" under almost any filtration conditions. However, a contrary situation exists in the case of soft, easily deformable particulates (e.g. gels) as it has been found that these deformable particulates will "squeeze through" the filtering medium because the pressure exerted upon the soft particulates causes them to deform. As a consequence, a soft particulate under modest filtration pressure may be forced against the filtering medium and may then squeeze through (and/or break up and move through) the filter cloth. [In any case, these soft particulates, although soft and deformable, are always more "solid-like" than the liquid which they are in.] In contrast, the process of the present invention recognizes the ability of soft, easily deformable particulates to easily squeeze through a filter cloth. The process of the present invention removes these soft particulates by employing laminar flow within the conduit so that the soft particulates travel through the conduit in a direction which is parallel to the conduit walls. The particulates are then deflected by an angled filter medium, the deflection of the particulates then resulting in a concentrated stream of particulates. The concentrated stream is then separated from the remainder of the "system" (the system is a multiphase system, the multiphase system being comprised of a liquid having particulates therein). The deflection of the soft particulates is achieved by controlling the flow conditions so that the flow of the particulates moving through the conduit is laminar and so that the soft particulates are only subjected to forces which are so slight that the soft particulates will not deform and penetrate the "filtering medium". The filtering medium is actually a "deflecting medium". The pressure drop across the deflecting medium is kept relatively small so that the soft particulates will be deflected instead of deformed and forced through the deflecting medium. It has been unexpectedly found that under the proper laminar flow conditions, soft, gelatinous particulates within a viscous multiphase system (actually a 2000 poise polymer solution of polyacrylonitrile in zinc chloride) will "roll" upon the surface of a screen which is angled with respect to the direction of laminar flow of the multiphase system, while the polymer solution penetrates the screen. The soft particulates which roll upon the surface of the screen move downstream, slightly transverse to the direction of laminar flow of the multiphase system. In this manner these "impermeable" particulates (i.e. the particulates which roll upon the screen and do not penetrate the screen as the liquid does) are concentrated into a particular region of the conduit's cross section. The impermeable particulates usually travel slower than the liquid, but they remain in motion even after they are relatively concentrated upon the surface of the screen. Hence, these moving particulates, once concentrated, are termed as "impermeable particulate concentrate stream". Should the flow of the particulate concentrate stream in the funnel tube be stopped, the particulates upon the screen would be forced against the screen and would eventually squeeze through the screen and/or break up and move through the screen. In an example of a 2000 poise polyacrylonitrile solution in zinc chloride, it has been found that large, soft particulates may even be forced through the screen by breaking and then reforming on the other side of the screen.

In the process of the present invention the particulate concentrate stream is fed into a second, smaller conduit which has impermeable walls. The impermeable particulate concentrate stream may then exit the main conduit by having the second, smaller conduit exit the wall of the main conduit.

The angle of deflection of impermeable particulates is always less than 90°, and is preferably less than 20°. The conditions for filtration may be set up so that most all particulates greater than a certain size are impermeable while all smaller particulates penetrate the filter. The viscosity of the fluid, the particulate size and softness, the rate of flow, the size of the openings in the screen, the conduit diameter and the angle of deflection of particulates determine the operational perameters of the laminar flow filtration apparatus. A screen is merely one embodiment of a "deflecting means". The requirements of a deflecting means are that it be permeable with respect to the liquid but impermeable with respect to the particulates which are to be removed from the multiphase system. Furthermore, the deflecting means should be smooth enough to allow impermeable particulates to travel across its surface. Although the filtration apparatus of the present invention may be embodied in any of an almost infinite variety of shapes, the shape found to operate best was similar to a funnel. The "funnel" had a semipermeable cone portion and a nonporous tube portion. The filter operates as a continuous separator of particulates. The cone portion is elongated so that the relatively slight angle of deflection creates a relatively slight force upon the impermeable particulates in order to prevent conditions under which a soft particulate would be deformed and forced through the semipermeable deflection means. The funnel-shaped filter deflected the impermeable particulates to the central portion of the main conduit (i.e. the conduit within which the filter was installed). It was conceived that the total amount of deflection of particulates would be less if the particulates were deflected to the middle of the main conduit, and it was also realized that, under laminar flow conditions, the flow rate was highest in the central portion of the conduit. The higher flow rate and minimal amount of deflection were conceived to be beneficial in the removal of soft particulates. However, other geometrical arrangements offered proof that given the proper flow conditions inside the main conduit (i.e. laminar flow), almost any angled filter (regardless of shape) would cause a deflection of impermeable particulates.

Under turbulent flow conditions within the conduit, the deflection of particulates has not been found to occur, as the fluid penetrates the filter medium at about 90° to the surface of the filter medium, no matter what the geometry (angled or otherwise) of the filter medium is. The particulates within a liquid contacting a filter medium (under turbulent flow conditions within the conduit) are forced directly into the filter medium, the direction of the force being perpendicular to the surface of the filter. Upon being forced directly into a filter medium, a particulate, whether hard or soft, does not tend to roll across the surface of the filter. However, in laminar flow of the system in the conduit, the placement of an angled filter medium results in the rolling or sliding of particulates along the surface of the angled filter medium.

Figure 6:
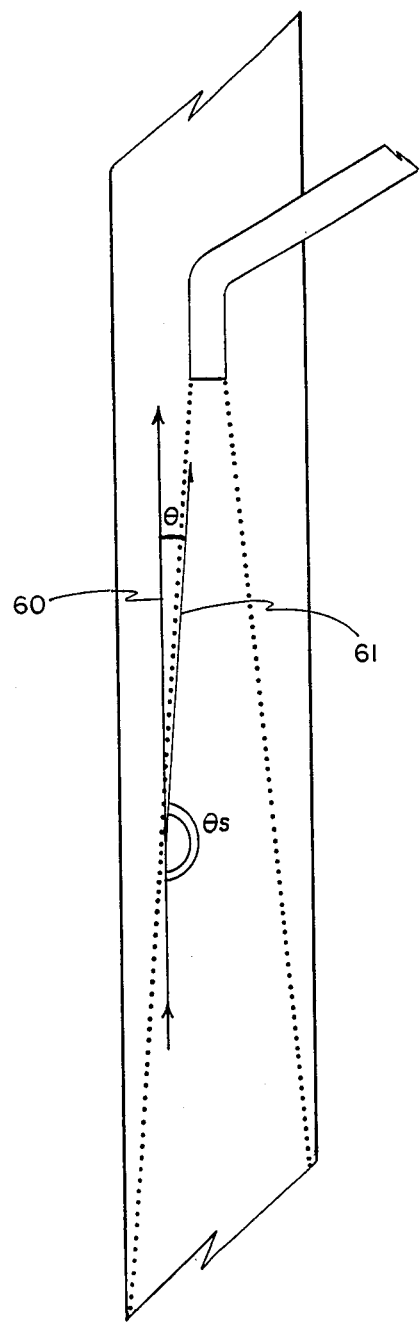
FIG. 6 is a schematic illustration of a laminar flow filter, indicating the directions of flow and the angle of deflection.
Figure 7:
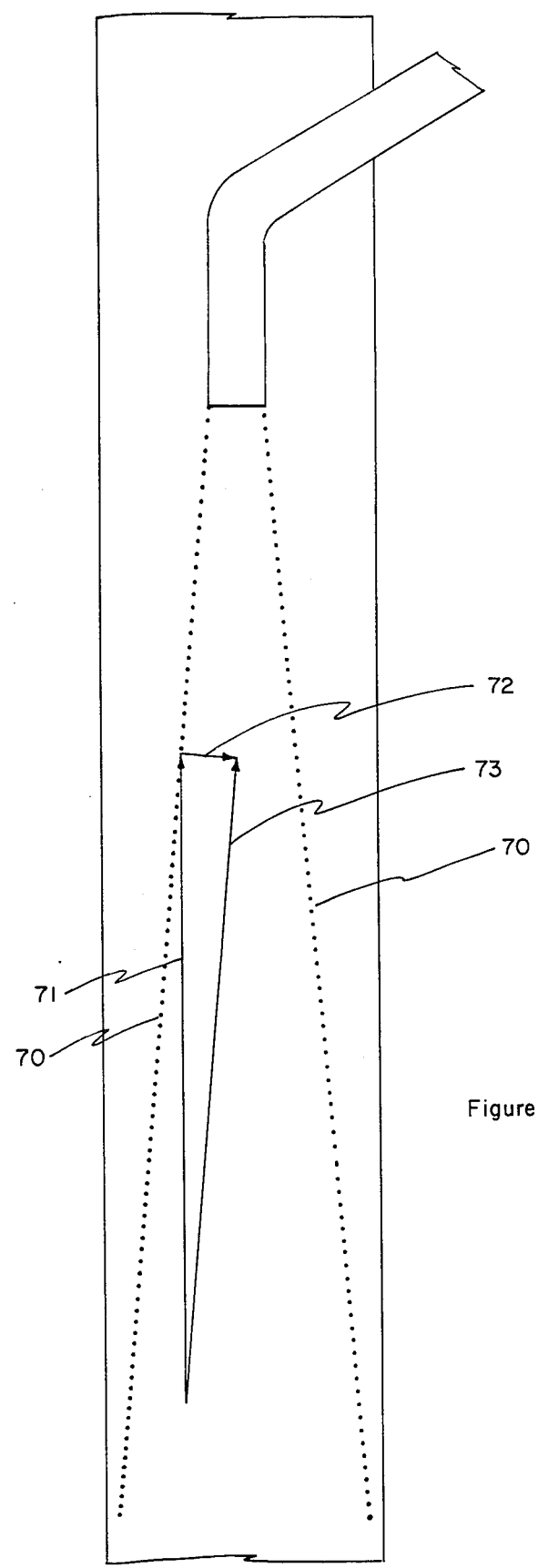
FIG. 7 is another schematic illustration of a laminar flow filter, indicating the force vectors involved in the filtration process.

FIG. 6 schematically illustrates an angled filter inside a conduit, the angled filter leading to a tube which is used to remove the impermeable particulate concentrate stream. Direction indicating line 60 represents the direction of movement of impermeable particulates, a direction which is, of course, parallel to the surface of the filtering medium. The angles formed between lines 60 and 61 are shown as $\theta$, herein defined as the "angle of deflection", and $\theta s$, which is the supplement of the angle of deflection. Henceforth, the use of the term "angle of deflection" is intended to refer to $\theta$. The angle of deflection, $\theta$, applies only to impermeable particulates which travel along the surface of the screen. Consider an impermeable particulate at a point upstream of the filter. The particulate is traveling in a dirction parallel to the conduit wall because the particulate is in a system undergoing laminar flow. Therefore, the particulate approaches the filter in the direction of line 60. Once the impermeable particulate reaches the filter, the particulate moves in the direction of line 61, i.e. along the surface of the filter. That is, the particulate's direction of movement is changed, or deflected, by the angle $\theta$. It is conceived that the process of the invention would only be operable if $\theta$ is <45°, because the force component along the surface of the deflecting medium (i.e. filter medium) is greater than the force component which drives a particulate into the filter. In FIG. 7, dashed line 70 represents the surface of the deflecting medium. Vector 71 represents the force and direction of the laminar flow. Vector 72 is directed perpendicular to the surface of the screen, and represents the component force exerted upon a particulate striking the deflection medium. Vector 73 represents the resulting force which is parallel to the surface of the deflecting medium. It has been conceived that so long as Vector 73 is greater than Vector 72, the deflection medium will operate. However, if $\theta$ (the angle of deflection) is greater than 45°, Vector 72 will be greater than Vector 73, and the particulates will be forced against the deflection medium (70) instead of being forced to slide along the deflection medium. Furthermore, it has been theorized that Vector 72 must be small enough to prevent too much gel deformation into the filter hole(s) during the time that the gel travels by the hole(s). In other words, the process is dependent upon how long the gel is in contact with a hole in the filter, in combination with the pressure the gel exerts on the hole and the ease of deformation of the gel.

Figure 2:
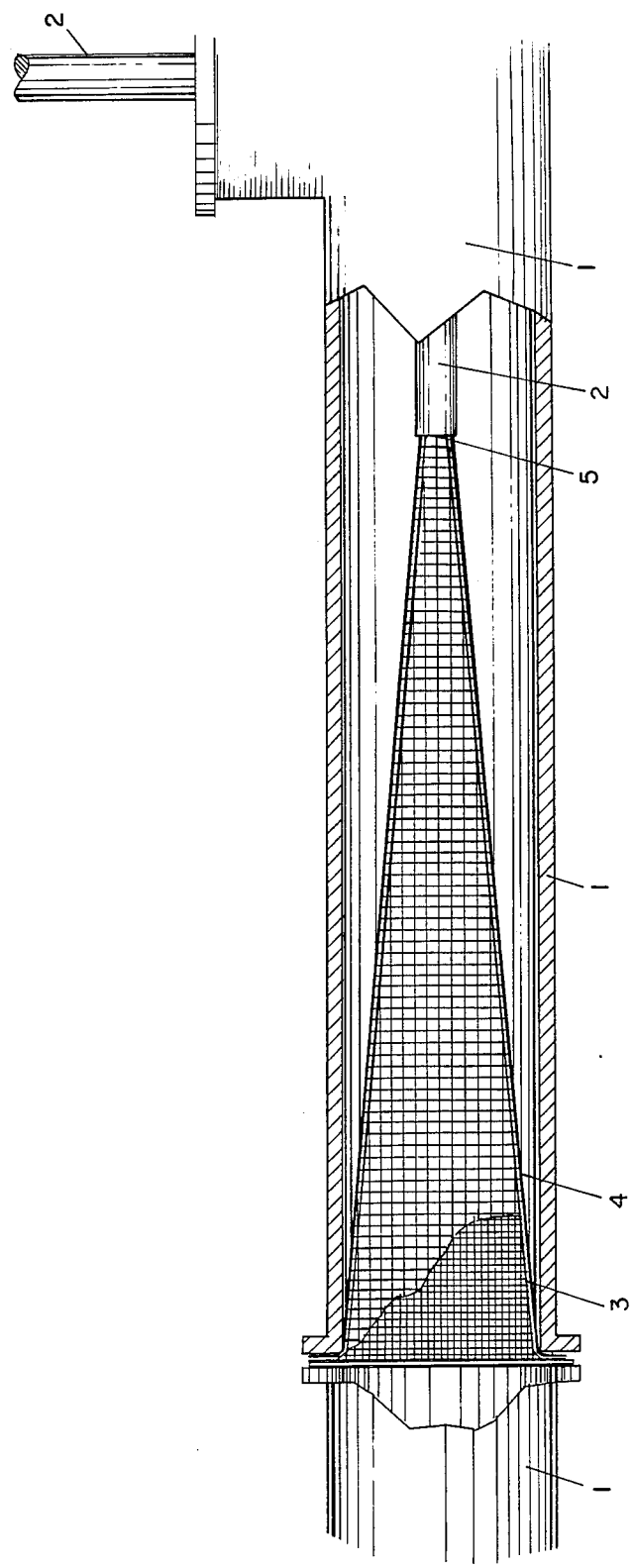
FIG. 2 is a cut away view of a laminar flow funnel filter in a conduit.
Figure 3:
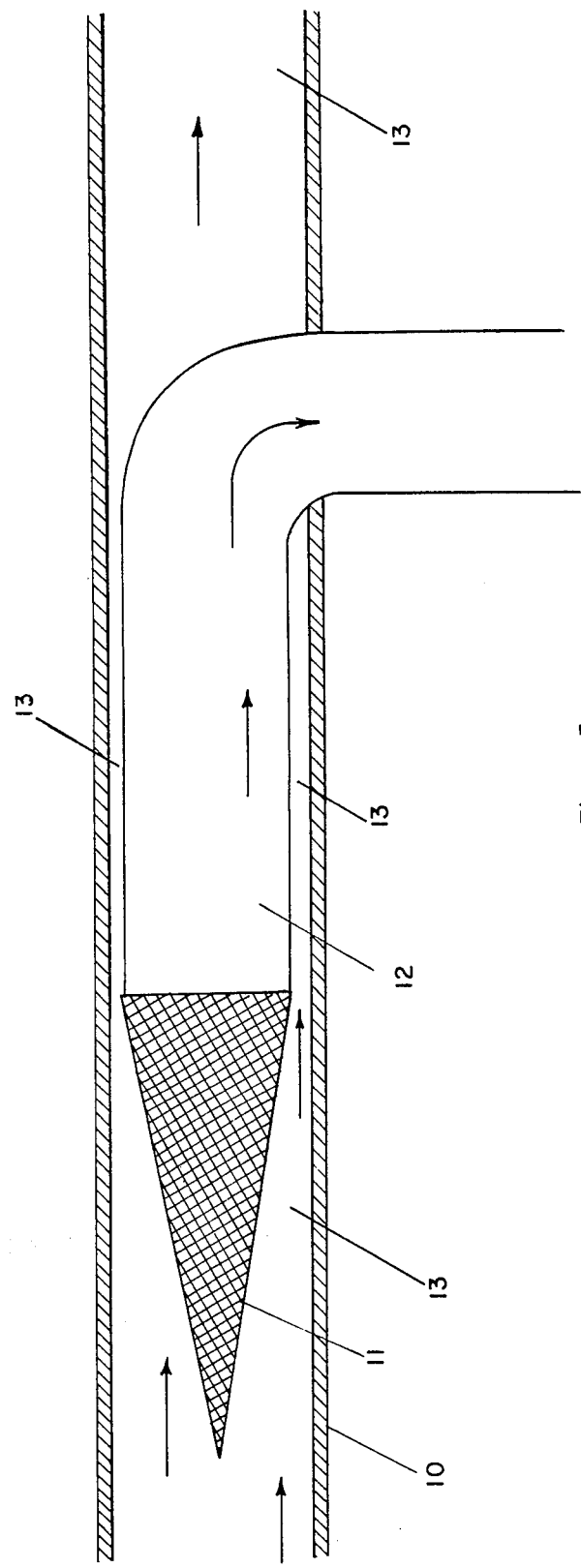
FIG. 3 is a longitudinal cross sectional view of another embodiment of a laminar flow funnel filter in a conduit.

In the preferred embodiment of the laminar flow filter as shown in FIGS. 1 and 2, the filter medium was comprised of a filter portion (3) and an attached funnel tube portion (2). The enlarged end of the filter portion (3) was preferably approximately the same size as the inside diameter of the conduit (1). The larger end of the filter portion (3) was secured to the inside wall of the conduit (1) so that the contents of the conduit could not bypass the filter portion (3). The filter portion (3) was made from a semipermeable material, preferably a screen, and the tube portion (2) was made from a nonpermeable material. The mesh size of the screen from which filter portion (3) was constructed was determined by the characteristics of the system being filtered and the characteristics of the desired filtrate. Those particulates to be separated from a multiphase system were those particulates which were impermeable to the filter. Those particulates within the multiphase system which could not penetrate material constituting the filter portion are heretofore known as "impermeable particulates". The impermeable particulates were directed into the filter portion (3) and through the tube portion (2) of the filter apparatus. As the impermeable particulates entered the filter portion (3) and were directed towards the tube portion (2), the impermeable particulates travelled upon the surface of and within the confines of the filter portion (3). As the impermeable particulates travelled within the confines of the filter portion (3), the cross sectional area of the filter portion (3) decreased as the particulates moved closer to the funnel tube portion (2). Therefore, the relative concentration of the impermeable particulates increased as the particulates within the filter portion (3) came closer to the funnel tube portion (2), due to the fact that the cross section of the filter portion (3) decreased in the direction of laminar flow of the multiphase system. In continuous operation, an impermeable particulate concentrate stream was formed immediately upstream of the funnel tube junction (5) and then entered into the nonporous tube portion (2). The impermeable particulate concentrate stream within the tube portion (2) was then directed to any desired location outside of the wall of the conduit (1), via the funnel tube portion (2). The tube portion (2) could be bent at practically any angle so that the tube portion (2) eventually passed through the wall of the conduit (1).

The filter portion (3) can be (and depending upon the amount of pressure and the strength of the filter portion (3), in some cases *must* be) backed by a supporting screen (4) in order to keep the filter portion from rupturing under the pressure exerted. The filter portion (3) was typically constructed from a wire screen which had relatively small sieve openings. The supporting screen (4) was constructed from a screen having considerably more strength than the screen used for the filter portion (3). The supporting screen (4) was positioned immediately downstream of the filter portion (3), so that the pressure exerted upon the filter portion (3) could contact the supporting screen (4) in order to transfer the pressure to the supporting screen (4). The supporting screen (4) was generally constructed from wire having a greater diameter than the wire used in the construction of the filter portion (3), and the supporting screen (4) also had more open area than the filter portion (3).

Although in the preferred embodiments both the funnel portion (3) and the supporting screen (4) were both made from screens, screens were not the only material conceived to be operable in the process of the present invention. Other suitable materials were conceived to include sheet materials having holes therein and cast porous materials, provided the proper shape for the deflection of particulates was incorporated into the design.

The preferred embodiment illustrated in FIG. 1 and FIG. 2 is not the only design conceived to be operable in the process of the present invention. FIG. 3 illustrates an alternative embodiment which incorporates a first conduit (10), a "filter portion" (11) and a second conduit (12). In this embodiment, as can be seen from the laminar flow direction indicating lines shown in FIG. 3, the process operates in somewhat of an opposite manner in comparison with the above described operation of the process illustrated in FIG. 1 and FIG. 2. In the embodiment illustrated in FIG. 3, the impermeable particulates contact the filter portion (11) and are deflected to the *outside* of the first conduit (10). The impermeable particulates then remain in the conduit (10) while the permeable portion of the solution passes through the filter portion (11). The second conduit (12) carries the permeable material to a different location than the destination of the impermeable particulate stream which forms within the first conduit (10). As shown in FIG. 3, the impermeable particulate concentrate stream need not be concentrated in the middle of the first conduit (10), although in the preferred embodiment as illustrated in FIG. 1 and FIG. 2 the impermeable particulate concentrate stream is concentrated in the middle of the conduit (8).

The embodiments described above illustrate the principle of operation of the present invention; particulates travelling in a straight line strike an angled semipermeable surface and are deflected so that they travel transverse to the direction of laminar flow, and thereby form a stream of concentrated particulates which are impermeable with respect to the semipermeable surface. The process of the present invention has been found to be inoperable in the separation of fibrous and film-like particulates, as film-like and fibrous particulates are not deflected by an angled semipermeable medium. Film-like particulates have no tendency to "roll" upon the angled surface, but instead lie flat against the angled medium (e.g. screen) and are held against it by the pressure exerted on the screen by the solution passing through the screen. Fibrous particulates have also been found to become trapped by the filter.

In the removal of very soft particulates from a multiphase system, soft particulates which are larger than the openings in the filter medium may deform and squeeze through a hole much smaller than the particulate cross section due to the ease of deformaton of the soft particulate and the pressure exerted upon the particulate. The pressure drop across the filter determines whether or not a relatively large particulate having a low resistance to deformation (i.e. a large, soft gel) will either squeeze through the filter or be deflected by the filter. In general, the higher the pressure drop across the filter, the "harder" (i.e. less deformable) must be a particulate in order to keep from forcing that particulate through the filter medium. Accordingly, when separating very soft particulates with a laminar flow filter, it is necessary to keep the pressure drop low in order to avoid forcing soft particulates through the filter. It has been found that a pressure drop below 4 psi must be maintained in order to avoid forcing soft gelatinous particulates through the 40 micron openings of a 325 mesh screen, for a system comprising a polymer solution of 2000 poise having soft (gelatinous) particulates therein. Above 4 psi pressure drop, soft gels were forced through the filtering medium. In the operation of the process of separation, it is advantageous to use a pressure drop approaching the maximum pressure drop suitable for that system, because the use of the maximum pressure drop produces the maximum rate of flow and hence yields the maximum rate of separation.

It has also been conceived that in the operation of the process of the present invention, it is most preferable to keep the flow rate in the funnel tube portion (2) at least as high as the flow rate in the corresponding portion of the conduit (1), in order to keep from forcing soft particulates through the filter portion (3). By "corresponding portion of the conduit (1)" is meant that portion of the conduit (1) cross-section which corresponds to the funnel-tube junction (5).

The performance of a laminar flow filtration process may be evaluated by comparing the particulates found in the solution flowing into the filter (i.e. the completely unpurified solution) with the particulates found in the purified stream and the particulates found in the particulate concentrate stream. In order to analyze any *viscous* solution for particulates, a representative sample of the viscous solution may be diluted, stirred and filtered (by conventional turbulent flow methods) and the particulates analyzed visually (via microscope). For example, the following procedure was utilized to analyze the particulate content of a 2000 poise polyacrylonitrile solution in zinc chloride:

DILUTION FILTRATION TECHNIQUE 900 grams of 60 percent aqueous zinc chloride solution were placed into an 800 milliliter beaker containing a ⅜th inch × 1½ inch magnetic stir bar. 100 grams of polymer solution (the polymer solution contained 60 percent aqueous zinc chloride and 11.7 percent polyacrylonitrile in solution) were added to this beaker, and the mixture was stirred until dispersion of the polymer solution in the zinc chloride was complete. This generally required at least four hours at the highest stirring speed possible. It was important that the polymer solution was completely dispersed in the zinc chloride solution. An incomplete mixing left very small thread-like particulates of the highly viscous polymer solution which appeared as fibers under a microscope.

The stirred solution was then filtered through a 30 micron plain weave stainless steel screen. This screen had a diameter of 33 millimeters and was mounted in the screw cap of a one liter polyethylene bottle. The bottom of the bottle was cut away and the bottle containing the screen was clamped in an inverted position. The diluted polymer solution was slowly poured into the truncated filter bottle in such a manner that the bottle never contained over 200 milliliters of solution at any one time. (This was to avoid excessive filtration pressure). After filtration, the beaker and plastic bottle were washed with 325 milliliter portions of filtered aqueous zinc chloride solution.

The screen was then removed from the holder and blotted on porous paper to remove excess zinc chloride solution. The number, size, and type of particles retained on the screen were determined by examination (of the screen) under a stereomicroscope at about 50× magnification.

From the above theoretical description and from the analytic procedure (the dilution filtration technique) described herein, and from illustrative Examples II and III below, one may determine the necessary construction details and operational parameters for the construction and operation of a laminar flow filter. A filter may be engineered to operate in accordance with a given solution viscosity, particulate size and hardness, particulate concentration, filtration rate, and degree of filtration. For example, by examining the characteristics of the system to be filtered and by determining the desired filtration characteristics one may determine suitable conduit sizes, funnel cross sections, angles of deflection, maximum pressure drops, etc., in order to optimize the process of removal of particulates from a viscous solution undergoing laminar flow.

It has been conceived that the areas of utility for the process of the present invention are manifold. The process is most useful for the removal of gelatinous (i.e. soft, easily deformable) particulates from viscous solutions, a process which is impossible to carry out continuously via prior art filtration methods. The removal of these particulates could result in extremely uniform (i.e. particulate free) viscous solutions. This is advantageous in the fiber industry as these inhomogeneities cause defects (broken, brittle, or weak regions) in filaments spun from solutions containing gels. Other areas of conceived utility include the manufacture of paints, plastics, films and any other manufacturing area which utilizes a viscous liquid which contains particulates. The process of the present invention is also very capital and energy efficient, and is believed to require less maintenance than other prior art methods.

The following examples are intended to illustrate specific embodiments of the process described herein and are not intended to limit the areas of utility in the operation of the present invention.

EXAMPLE I

This example is intended to illustrate a prior art method of filtration of a viscous solution which contained both hard and soft particulates.

A 2000 poise polymer solution containing polyacrylonitrile dissolved in 60 percent aqueous zinc chloride was made up in the following proportions:
(a) 60 percent aqueous zinc chloride: 88 percent by weight
(b) polyacrylonitrile: 12 percent by weight
in accord with U.S. Pat. No. 2,763,636. The polymer solution was then pumped into a filter press manufactured by T. Shriver and Company, Inc. of Harrison, N.J. The Shriver plate and frame press contained 25 plates and 25 frames, each of which measured 36" on square. The polymer solution, at a temperature between 30° C. and 40° C. and having a specific gravity of 1.65, was pumped into the press at between 70 and 95 psig, at a rate of between 130 and 230 gallons per hour. The filter cloth used in the press was polypropylene, XT11801 manufacatured by Globe Albany Manufacturing. The filter cloth had a weight of 10–11 oz. per square yard and a permeability of between 70 and 150 cubic feet per minute per square foot of cloth at 0.5 inches of water pressure. The filter cloth had a nominal pore size of 5 microns. Depending upon the amounts of particulates entrapped in the filter cloth, the pressure drop across the cloth ranged from 35 to 45 psig. The effectiveness of the filtration varied, depending upon the previous exposure of the filter cloth to particulates, and the type of particulates to which the filter cloth was exposed. Although the filter cloth was initially able to filter off both soft and hard particulates found within the polymer solution, almost immediately soft gels which were 150 –200$\mu$ in diameter were found to penetrate the filter cloth upon analysis by the dilution filtration technique described herein.

EXAMPLE II

Figure 4:
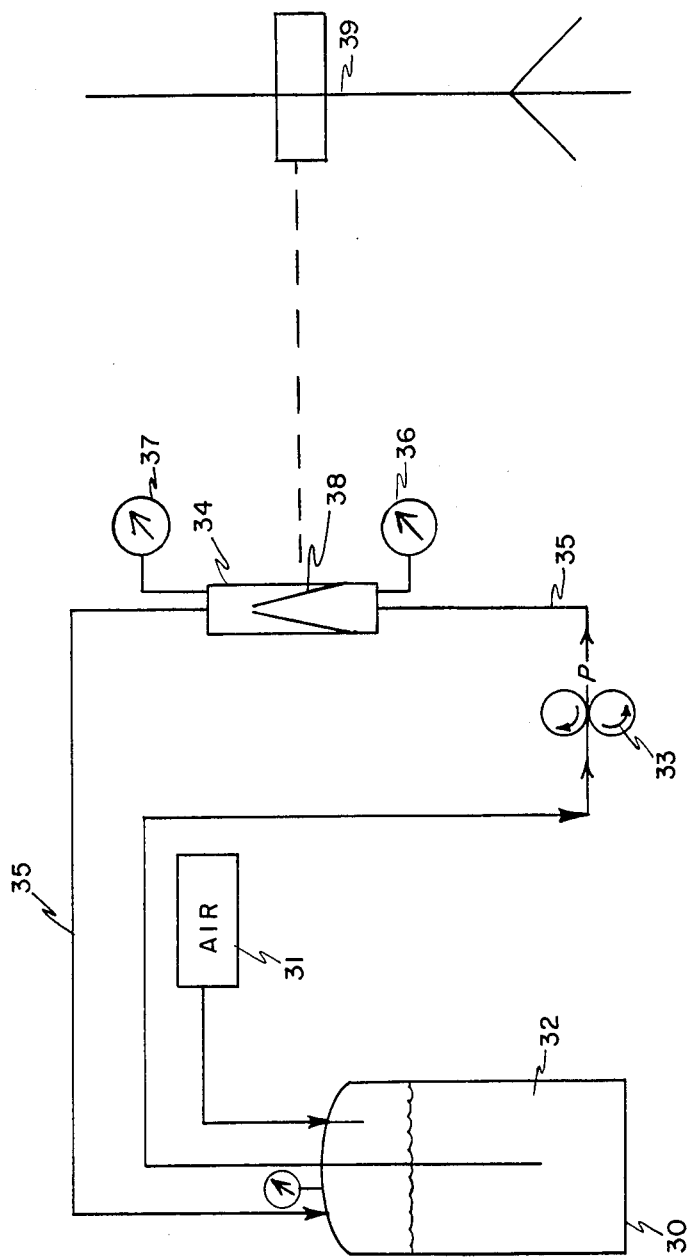
FIG. 4 is a diagrammatic view of the system used to study the operational characteristics of a laminar flow funnel filter, as described in Example II.

A laboratory arrangement was set up to simply observe a laminar flow filtration apparatus in operation (see FIG. 4). The laminar flow filtration apparatus was utilized in continuous operation within a closed system.

A plate and frame filter press cloth (from a Shriver press as described in Example I) previously used to filter polymer solution was found to be covered with gelatinous particulates of highly varying size and hardness. Several hundred milliliters of the gels were culled from the filter cloth and placed in a container to which was added to enough 60 percent aqueous zinc chloride solution to make the total volume 500 milliliters. This mixture was blended in a Waring blender for 1 or 2 minutes. The blended mixture was then dyed by adding 10 c.c. of Remastical Blue 36, while continuously stirring the mixture. Twenty milliliters of this mixture was then added to 5 gallons of a solution approximately 88 percent of which was made up of a 60 percent aqueous zinc chloride solution and approximately 12 percent of which was dissolved polyacrylonitrile (this solution was produced in accordance with U.S. Pat. No. 2,763,636). The resulting particulate laden polymer solution was stirred overnight in order to distribute the particulates throughout the polymer solution. The solution had a viscosity of approximately 2000 poise.

The particulate laden polymer solution (32), containing particulates which were dyed blue, was poured into a pot (30) as shown in FIG. 4. As shown in FIG. 4, the apparatus used to observe the operation of the laminar flow filter was comprised of a pot (30) which was pressurized by a source of compressed air (31). The particulate laden polymer solution (30) was pumped through a conduit (35) by a 10 cc/revolution Zenith (gear) pump (33). The Zenith pump (33) forced the solution (32) to be pumped out of the pot (30), through the Zenith pump (33), past a first pressure gauge (36), into and through a 2" i.d. glass pipe (34) containing a funnel screen portion (38) of a laminar flow filter, past a second pressure gauge (37), and back into the pot (30). The screen portion (38) was comprised of only a separating screen and a support screen [i.e. the funnel screen portion (38) did not have a funnel tube to direct impermeable particulates out of the glass pipe (34) or conduit (35), but instead allowed continuous observaton of the interaction of dyed particulates with the separating screen]. The Zenith pump (33) was used to regulate the flow rate through the conduit (35), and could therefore be used to regulate the pressure drop across the screen (38). Of course, the pressure drop across the screen (38) increased with increasing flow rate.

In the operation of the above-described arrangement, a cathetometer (39) was used to observe the interaction between the dyed gel and the screen portion (38). The screen portion (38) was comprised of a separating screen and a supporting screen, the supporting screen being immediately downstream of the separating screen. The separating screen was a 325 mesh screen having 0.0017 inch sieve openings, 0.0012 inch wire diameter, and 30.5 percent open area. The supporting screen used was a 20 gauge screen having 0.0331 inch sieve openings, 0.0201 inch wire diameter, and 33.8 percent open area. The supporting screen was required only to prevent bursting of the separating screen in the event that the pressure drop across an unsupported filter screen would be high enough to burst the filter screen. [Under a relatively high pressure drop, a supported filter screen may be forced against the supporting screen (immediately downstream) so that the filter screen will not burst under the pressure of the viscous solution flowing through it.]

The screen portion (38) assembly was approximately 18 inches long and had a 2-inch diameter at the upstream end and a 0.5" diameter at the downstream end. Both the filter screen and the support screen had these dimensions.

The behavior of the particulates was observed as a function of the pressure drop across the filter screen. The pressure drop across the screen assembly (38) was measured by taking the difference between the pressure readings on the two gauges (36 and 37) which were immediately upstream (36) and immediately downstream (37) of the 2-inch (inside diameter) glass pipe (34) which contained the filter screen assebly (38). Due to the pressure drop caused by the wall of the glass pipe (34), the pressure drop (calculated) was always slightly higher than the real pressure drop caused by the screen assembly (38). Furthermore, the supporting screen contributed to the overall pressure drop calculated. The contributions of both the wall of the glass pipe (34) and the separating screen were thought to be relatively small by comparison to the pressure drop caused by the separating screen. Therefore the pressure drop figures mentioned herein are considered to be relatively significant as applied to the present system, because the pressure drop was considered to be caused mostly by the separating screen.

In the observation of the apparatus, the flow rate was always such that laminar flow resulted. The filter assembly (38), upon being viewed with the cathetometer (39) revealed that the dyed particulates which were not penetrating the filter assembly (38) were moving along the surface of the filter assembly (38), and exiting the 0.5" diameter of the downstream end of the filter assembly (38). The particulates within the polymer solution ranged in hardness from extremely soft and easily deformable gelatinous particulates. The soft gels were generally colorless until dyed blue, but the harder, less deformable gels were not dyeable. The harder gels were generally red or reddish brown in color, and could be easily seen before dyeing. After dyeing, much of the dye leached out of the particulates and into the polymer solution. Therefore the soft gels were left very slightly blue while the hard gels remained red or reddish brown (i.e. the hard gels showed relatively no change in color due to the dyeing process).

Although most of the gels tended to roll along the surface of the filter, higher pressure drops induced the filter to act like a conventional filter as large gels would deform and pass through the screen. The size of the gel passed increased with increasing pressure drop across the filter. It was found that the movement of gels on the surface of the filter screen was affected by the pressure drop across the screen. Tests at different pressure drops revealed that soft gels stick to the screen above a certain pressure drop (with this arrangement it was found that above 3 psi pressure drop, the soft gels stuck to the screen). At pressure drops above this critical pressure (i.e. 3 psi), the force of the polymer solution flowing through the screen deformed soft gels so much that they were pulled into the screen openings. It was observed that smaller gels moved more slowly along the screen because their size allowed them to be pulled into "holes" more easily. The soft gels that were only slightly larger than the screen hole size were sometimes observed to be moving at a rate of only 1/50th the rate of movement of the polymer solution in the middle of the pipe. The pressure drop was never raised so high that turbulent flow conditions was observed in the conduit. The harder (red and reddish brown) gels were less deformable and were found to move along the surface of the screen at much higher speeds, sometimes approaching the average speed of the polymer solution.

EXAMPLE III

The performance of a laminar flow filter was measured quantitatively in the process of manufacturing acrylic fiber similar to that described in U.S. Pat. No.

Figure 5:
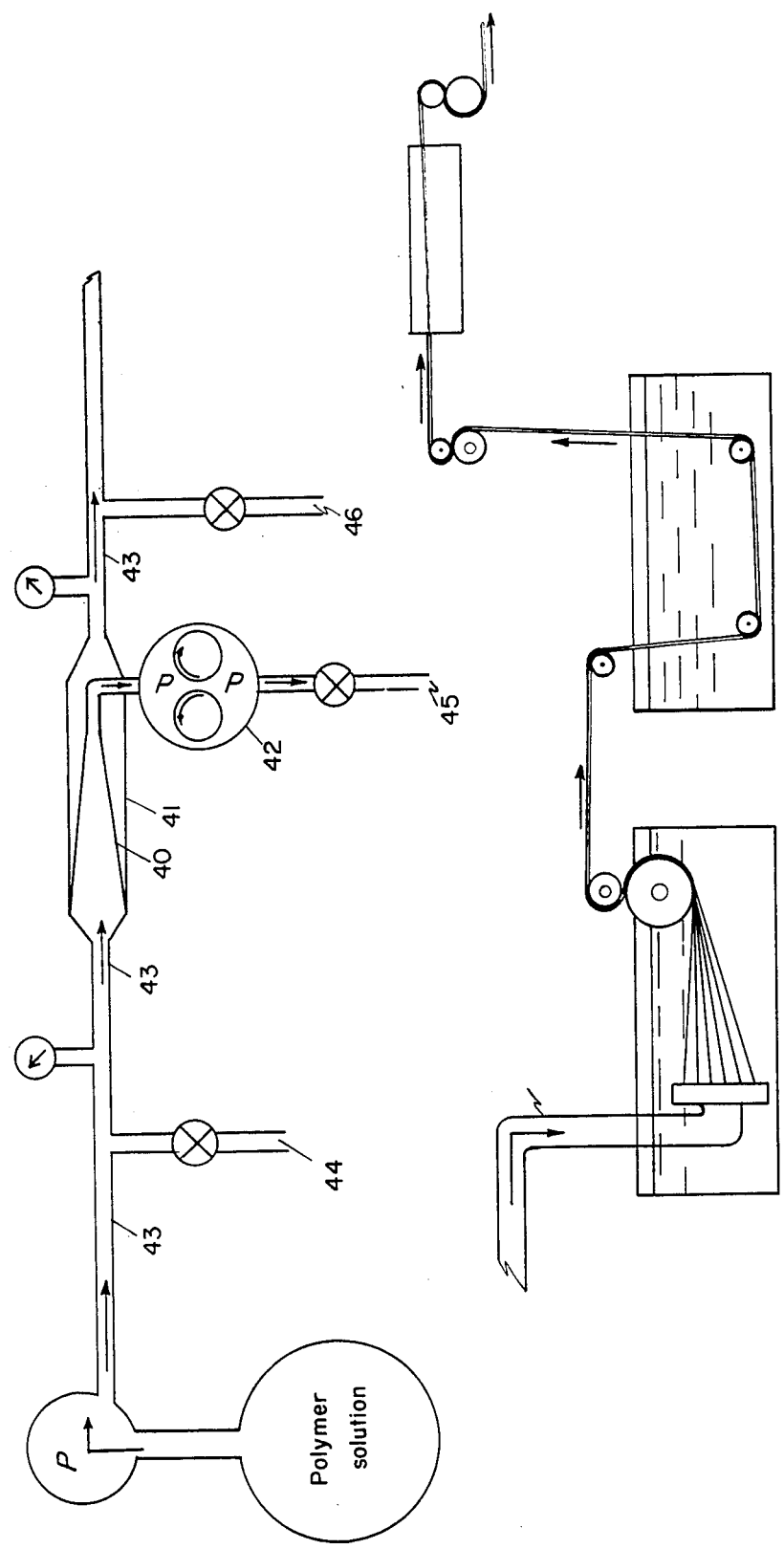
FIG. 5 is a diagrammatic view of the system utilized in the manufacture of fiber, as described in Example III.

2,790,700. The polymer solution supplied to the spinneret was produced in accordance with U.S. Pat. No. 2,763,636. A laminar flow filtration apparatus was installed immediately prior to the spinneret, as shown in FIG. 5. The filter assembly (40) was again cone shaped, with the upstream end of the filter (40) occupying the entire cross section of a 2" i.d. pipe (41) within which the filter (40) was installed. The funnel portion of the filter was 30 inches long, and the downstream end of the funnel portion had a 0.5 inch diameter. The filter screen itself was constructed of the same material from which the 325 mesh stainless steel screen used in Example II was constructed. A 10 cc. Zenith pump (42) was used to regulate the flow rate within the gel concentrate stream which formed within the filter assembly (40) [as opposed to regulating the flow rate through the entire filtration device as in Example II]. The gel concentrate stream exited at 45. The polymer solution was pumped through a conduit (43) at a regulated rate which allowed the pressure drop across the filtration apparatus to remain at about 3 psi. Samples of the polymer solution were then taken both a) prior to the filter (at 44) and b) from the spinneret head (at 46). A control run utilizing the same system but with a Ronigen-Petter filter in place of the laminar flow filter was also done, with the samples being taken from the same relative locations as (44) and (46) above. The samples were analyzed by the dilution filtration technique described above. Gel counts for each of the above runs were made. The data are given in Table I.

From the data shown in Table I, it is apparent that the laminar flow filter was effective in removing particulates which were above 100 microns in size. It is also apparent that the Ronigen-Petter filter removed only about 25 percent of the particulates above 100 microns in size.

TABLE I

| | LAMINAR FLOW FILTER: concentration of particulates greater than 100μ in size | RONIGEN-PETTER FILTER: concentration of particulates greater than 100μ in size |
|---|---|---|
| Results of Dilution-Filtration Analysis at 44 (before filtration) | 15 gels/cc | 15 gels/cc |
| Results of Dilution-Filtration Analysis at 46 (after filtration) | 0 gels/cc | 11 gels/cc |

We claim:

1. A process of separating particulates from a multiphase system, the multiphase system being comprised of a liquid and particulates therein, the process comprising the steps of:

(a) flowing the multiphase system through a conduit and into a laminar flow filter, the multiphase system exhibiting laminar flow characteristics as it flows through the conduit, the multiphase system flowing in a direction which is parallel to the conduit walls, the multiphase system exhibiting laminar flow characteristics both before and after filtration;

(b) concentrating impermeable particulates within the laminar flow filter, the filter being impermeable to at least some of the particulates within the multiphase system so that a portion of the multiphase system which has permeated the filter is free of impermeable particulates, the filter comprising a semipermeable portion, the semipermeable portion being positioned at an angle to the direction of laminar flow of particulates approaching the filter so that the impermeable particulates are deflected at an acute angle to the direction of laminar flow of the multiphase system, the acute deflection of the impermeable particulates creating a stream of impermeable particulates; separating the impermeable particulates from that portion of the multiphase system which permeates the filter so that the multiphase system flowing into the filter is split into a first stream which is an impermeable particulate concentrate stream and a second stream which is free of impermeable particulates.

2. A process as described in claim 1 wherein the flow of the multiphase system through the conduit exhibits a Reynolds Number below 2000.

3. A process as described in claim 1 or claim 2 wherein the impermeable particulates are comprised of gelatinous particulates which are easily deformable.

4. A process as described in claim 1 or claim 2 wherein a liquid within the multi-phase system is comprised of a polymer.

5. A process as described in claim 1 or claim 2 wherein the impermeable particulate concentrate stream is directed into a conduit having impermeable walls.

6. A process as described in claim 1 or claim 2 wherein the laminar flow filter is funnel-shaped.

7. A process as described in claim 6 wherein the funnel-shaped laminar flow filter is positioned so that the impermeable particulate concentrate stream is formed in a central region of the conduit in which the funnel-shaped laminar flow filter is installed, the funnel-shaped filter having a funnel tube attached thereto, the funnel tube being constructed of a materia( with respect to which the multiphase system is impermeable.

8. A process as described in claim 1 or 2 wherein the acute angle of deflection of impermeable particulates is less than thirty degrees.

9. A process as described in claim 1 or 2 wherein the acute angle of deflection of impermeable particulates is less than twenty degrees.

* * * * *